(12) United States Patent  
Albertsson et al.

(10) Patent No.: US 8,385,848 B2  
(45) Date of Patent: Feb. 26, 2013

(54) APPARATUS AND METHOD PROVIDING PUSH TO TALK OVER CELLULAR (POC) DYNAMIC SERVICE OPTIONS

(75) Inventors: Henrik Albertsson, Stockholm (SE); Jan Holm, Örbyhus (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 13/405,959

(22) Filed: Feb. 27, 2012

(65) Prior Publication Data

US 2012/0157087 A1    Jun. 21, 2012

Related U.S. Application Data

(63) Continuation of application No. 12/091,109, filed as application No. PCT/EP2006/067297 on Oct. 11, 2006, now Pat. No. 8,150,334.

(30) Foreign Application Priority Data

Oct. 28, 2005  (EP) .................................... 05110139

(51) Int. Cl.  
*H04B 1/38* (2006.01)

(52) U.S. Cl. .................................. 455/90.2; 455/422.1

(58) Field of Classification Search .................. 455/90.2  
See application file for complete search history.

(56) References Cited

U.S. PATENT DOCUMENTS

| | | | | |
|---|---|---|---|---|
| 6,477,150 B1 * | 11/2002 | Maggenti et al. | ............. | 370/312 |
| 6,968,180 B2 * | 11/2005 | Kirby et al. | ............. | 455/414.1 |
| 7,023,813 B2 * | 4/2006 | Newberg et al. | ............. | 370/312 |
| 7,062,253 B2 * | 6/2006 | Money et al. | ............. | 455/406 |
| 7,107,017 B2 * | 9/2006 | Koskelainen et al. | ........ | 455/90.2 |
| 7,280,502 B2 * | 10/2007 | Allen et al. | ............. | 370/329 |
| 7,324,505 B2 * | 1/2008 | Hoover | ............. | 370/352 |
| 7,369,567 B2 * | 5/2008 | Newberg et al. | ............. | 370/432 |
| 7,474,741 B2 * | 1/2009 | Brunson et al. | ............. | 379/88.17 |
| 7,499,720 B2 * | 3/2009 | Idnani | ............. | 455/519 |
| 7,512,410 B2 * | 3/2009 | Kuroda et al. | ............. | 455/518 |
| 7,529,540 B2 * | 5/2009 | Cox et al. | ............. | 455/414.1 |
| 7,558,286 B2 * | 7/2009 | Khatter | ............. | 370/468 |
| 7,623,883 B2 * | 11/2009 | Park et al. | ............. | 455/519 |
| 7,624,188 B2 * | 11/2009 | Koskelainen | ............. | 709/229 |
| 7,738,894 B2 * | 6/2010 | Sung et al. | ............. | 455/518 |
| 7,751,842 B2 * | 7/2010 | Sung et al. | ............. | 455/518 |
| 7,756,537 B2 * | 7/2010 | Laurila et al. | ............. | 455/517 |
| 7,761,547 B2 * | 7/2010 | Matsubara et al. | ............. | 709/223 |
| 7,813,747 B2 * | 10/2010 | Allen et al. | ............. | 455/518 |
| 7,817,995 B2 * | 10/2010 | Khurana et al. | ............. | 455/420 |
| 7,885,675 B2 * | 2/2011 | Wu et al. | ............. | 455/519 |
| 7,978,684 B2 * | 7/2011 | Vimpari et al. | ............. | 370/352 |
| 7,991,417 B2 * | 8/2011 | Albertsson et al. | ............. | 455/518 |
| 7,991,419 B2 * | 8/2011 | Matsumoto et al. | ............. | 455/518 |
| 7,996,228 B2 * | 8/2011 | Miller et al. | ............. | 704/270.1 |
| 8,000,732 B2 * | 8/2011 | Albertsson et al. | ............. | 455/518 |
| 8,010,142 B2 * | 8/2011 | Wild et al. | ............. | 455/518 |
| 8,019,383 B2 * | 9/2011 | Kossi et al. | ............. | 455/553.1 |
| 8,023,979 B2 * | 9/2011 | Sung et al. | ............. | 455/518 |
| 8,036,608 B2 * | 10/2011 | Holm | ............. | 455/90.2 |
| 8,050,699 B2 * | 11/2011 | Sung et al. | ............. | 455/518 |

(Continued)

*Primary Examiner* — Hai Nguyen

(57) ABSTRACT

A method and server for establishing a push to talk type service such as push to talk over cellular (PoC). The server receives a message from Client A indicating one or more media types that Client A will accept in defined circumstances in a push to talk type session. When the server receives a message from Client B inviting Client A to establish a push to talk type session for one or more proposed media types, the server determines whether the media type(s) proposed by Client B are acceptable to Client A. If at least one proposed media type is acceptable, the server forwards the invitation to Client A with a list of the acceptable media types. Thereafter the session is established.

18 Claims, 2 Drawing Sheets

U.S. PATENT DOCUMENTS

| | | | |
|---|---|---|---|
| 8,077,634 B2 * | 12/2011 | Maggenti et al. | 370/260 |
| 8,095,665 B1 * | 1/2012 | Bau | 709/227 |
| 8,135,386 B2 * | 3/2012 | Schneyer et al. | 455/411 |
| 8,150,334 B2 * | 4/2012 | Albertsson et al. | 455/90.2 |
| 8,180,386 B1 * | 5/2012 | Delker et al. | 455/518 |
| 8,180,387 B2 * | 5/2012 | Sung et al. | 455/519 |
| 8,184,558 B2 * | 5/2012 | Rossotto et al. | 370/259 |
| 8,204,041 B2 * | 6/2012 | Britsch | 370/352 |
| 8,233,929 B2 * | 7/2012 | Lee et al. | 455/518 |
| 8,239,547 B2 * | 8/2012 | Synnergren et al. | 709/228 |
| 2002/0173327 A1 * | 11/2002 | Rosen et al. | 455/518 |
| 2004/0009761 A1 * | 1/2004 | Money et al. | 455/406 |
| 2004/0125760 A1 * | 7/2004 | Newberg et al. | 370/312 |
| 2004/0125802 A1 * | 7/2004 | Lillie et al. | 370/390 |
| 2004/0224710 A1 * | 11/2004 | Koskelainen et al. | 455/518 |
| 2005/0041578 A1 * | 2/2005 | Huotari et al. | 370/229 |
| 2005/0124365 A1 * | 6/2005 | Balasuriya et al. | 455/518 |
| 2005/0255811 A1 * | 11/2005 | Allen et al. | 455/78 |
| 2006/0023649 A1 * | 2/2006 | Tillet et al. | 370/310 |
| 2006/0025165 A1 * | 2/2006 | Tillet et al. | 455/517 |
| 2006/0035630 A1 * | 2/2006 | Morishima et al. | 455/416 |
| 2006/0046757 A1 * | 3/2006 | Hoover et al. | 455/518 |
| 2006/0046758 A1 * | 3/2006 | Emami-Nouri et al. | 455/518 |
| 2006/0053208 A1 * | 3/2006 | Laurila et al. | 709/206 |
| 2006/0087973 A1 * | 4/2006 | Huang | 370/234 |
| 2006/0087982 A1 * | 4/2006 | Kuure et al. | 370/252 |
| 2006/0089131 A1 * | 4/2006 | Huang | 455/414.1 |
| 2006/0149811 A1 * | 7/2006 | Bennett et al. | 709/203 |
| 2006/0153102 A1 * | 7/2006 | Kuure et al. | 370/263 |
| 2006/0155814 A1 * | 7/2006 | Bennett et al. | 709/207 |
| 2006/0229095 A1 * | 10/2006 | Sung et al. | 455/518 |
| 2006/0234744 A1 * | 10/2006 | Sung et al. | 455/518 |
| 2007/0021138 A1 * | 1/2007 | Allen et al. | 455/518 |
| 2007/0127670 A1 * | 6/2007 | Morishima et al. | 379/202.01 |
| 2007/0238478 A1 * | 10/2007 | Sung | 455/518 |
| 2007/0270104 A1 * | 11/2007 | Allen et al. | 455/78 |
| 2008/0162637 A1 * | 7/2008 | Adamczyk et al. | 709/204 |
| 2008/0170563 A1 * | 7/2008 | Zhu et al. | 370/352 |
| 2008/0320083 A1 * | 12/2008 | Albertsson et al. | 709/205 |
| 2010/0323742 A1 * | 12/2010 | Allen et al. | 455/519 |
| 2012/0185547 A1 * | 7/2012 | Hugg et al. | 709/206 |

* cited by examiner

APPARATUS AND METHOD PROVIDING PUSH TO TALK OVER CELLULAR (POC) DYNAMIC SERVICE OPTIONS

RELATED APPLICATIONS

This application is a continuation of U.S. patent application Ser. No. 12/091,109 filed Jul. 25, 2008 now U.S. Pat. No. 8,150,334, which is a 371 of International Application No. PCT/EP2006/067297, filed Oct. 11, 2006, the disclosures of which are fully incorporated herein by reference.

BACKGROUND

1. Field of the Invention

The present invention relates to methods and apparatus for use in a so-called push to talk over cellular service.

2. Description of Related Art

Walkie-talkie type services have long proved popular amongst users who wish to communicate brief messages quickly between one another. Conventionally, such services have been provided by two-way portable radios which utilize a dedicated part of the radio spectrum, but which only allow users to communicate with a small group of pre-selected users who utilize similar terminals and who are within range of the relatively short operating range of the radios. More recently, services have been introduced into the United States which piggy-back on the existing cellular telephone infrastructure. However, these services have been proprietary in nature and have not allowed users to communicate between different operator networks.

In an attempt to broaden the use of walkie-talkie type services, an industry grouping known as the Open Mobile Alliance (www.openmobilealliance.org) has been established with the aim of standardizing suitable protocols which will allow inter-network operability for Walkie-Talkie services offered over cellular networks. The service established by the various standards is known as Push to talk Over cellular (PoC). PoC proposes that associated speech data will be transported over a packet switched access network. In the case of GSM and UMTS, this will be the general packet radio service (GPRS) or 3G access network. In other network architectures, analogous packet switched access networks will be utilized for transporting talk data. Push to Talk services may also be offered over circuit switched access networks, although this is not the preferred option.

The Push to talk over Cellular (PoC) system is typically implemented on GSM/GPRS/3G networks and which makes use of the IP Multimedia Subsystem (IMS) standardized by the $3^{rd}$ Generation Partnership Project to facilitate the introduction of advanced data services into cellular networks, and in particular of real-time multimedia services. The IMS relies upon the Session Initiation Protocol (SIP) which has been defined by the Internet Engineering Task Force (IETF) for the setting up and control of multimedia IP-based sessions. A PoC Server is located within the IMS or is attached thereto, and implements the functionality for setting up and controlling PoC Sessions.

Existing push-to-talk (PTT) systems typically use a control mechanism to grant one of the users the right to speak while other users in the communication are denied such right and are in listening mode. Such control mechanism is typically referred to as floor control, talker arbitration, talk burst control, etc. For example, the Open Mobile Alliance is currently working on a specification of Push-To-Talk over Cellular (PoC) system, which includes Talk Burst Control Protocol (TBCP).

To request the right to speak on behalf of the user, the terminal (PoC Client) typically sends a request message to the controller (PoC Server). The controller typically responds either granting or rejecting the request. The controller typically restricts the time the user is allowed to talk, typically by starting an allowed talk timer when it grants the request, and uses some mechanism to interrupt the user, typically by sending a revoke message to the user's terminal or by simply not forwarding the user's media. The user who is interrupted by the controller is typically penalized by the controller in some way, e.g. by not granting the user the right to speak for a certain period of time.

The next version of OMA PoC (herein called "PoC 2", with the previous version being called "PoC 1") is evolving in OMA. Part of the new functionality in PoC 2 is to include new media types, allowing the sending of pictures, video etc in the PoC Sessions. However, an end user or client may only be able to (or opt to) handle a subset of all the available media. In view of this there will be requirements to include functionality for media barring. The following extract is from the OMA PoC 2 Requirement Document [OMA-RD-PoC-V2_0-20050902-D Push to Talk Over Cellular 2 Requirements, Draft Version 2.0-02. September 2005]: "In addition to what is specified in PoC 1.0 the incoming PoC Media Barring feature is needed when the receiving PoC User does not want to receive certain media at certain moment. He can require the barring without interfering to the conversion and media sharing within the rest group". Also from the OMA PoC 2 Requirement Document: "The PoC Client MAY support separate incoming media barring for each media type"; "The PoC Client MAY support different accept and reject rules for each media type"; "The PoC Service Infrastructure SHALL support separate in-coming PoC Media barring for each media type"; "The PoC Service Infrastructure SHALL use the manual answer mode as the default answer mode for the PoC Sessions when video is the media (The PoC User can configure the answer mode as he wishes)"; "The PoC Service Infrastructure SHALL use the automatic answer mode as the default answer mode for the PoC Sessions with only messaging media or when adding messaging to the on-going PoC Session"; "The PoC Service Infrastructure SHALL use the answer mode according to the Answer Mode Setting the same way as PoC1 specified"; and "The PoC Service Infrastructure SHALL use different accept and reject rules for each media type, if configured by the PoC Client".

PoC 1 does not contain functionality for Media Barring; this is new proposed functionality in PoC 2. PoC 2 will enrich the communication with the new media types, such as video, text messaging etc, in a PoC session compared to PoC 1 where only audio/talkburst is possible. A PoC 2 session can use, for example, audio/talkbursts in parallel with video. From an end user's perspective there may be situations where he/she wishes to limit the different medias that are used in a PoC Session. For example the user may only want to accept audio/talkburst media and not video media. Reasons for this may include being in an environment or circumstance where video, is not appropriate to use, or perhaps in a region of limited bandwidth, or having a low battery level and knowing that video display may be too much of a power drain. It is the recipient (that is the terminating user of the PoC call) that chooses to bar the media offered in the session of the originating user, rather than the sender who chooses not to send certain types of media.

PoC (and IMS in general) is divided up into a control plane, where SIP signaling is used, and a media plane, where the payload (voice, video etc) is transported using various protocols such as RTP, MSRP etc. When setting up a PoC Session (or any other SIP session), information about what media will be used for that session is transported in the Session Description Protocol for multimedia sessions, SDP [RFC 2327], which is part of the SIP message. This is used to align the media streams from the sender and the recipient. The sender sends information about each media type it wants to use in the session, and the recipient will answer with all or a subset of the offered media.

Basic operation is to determine what capabilities the originating and terminating clients are jointly capable of. For example, the originating client may have a camera with a good color screen, enabling video calls, but the recipient terminal may be a low-end terminal without a screen—in which case there is no need to start a video session. However, the same functionality can be lifted to the end user where he/she can determine what kind of communication it wants to establish with the other user.

The normal case is that the recipient's client will answer, for each incoming session, which of the offered media in the SDP it can or will accept for the session. There are several limitations to this:

Firstly, in a mobile environment, if none of the media that is offered by the originator can be accepted by the recipient, there has been a wasted roundtrip over the air interface.

Secondly, in the future the concept of media barring may be expanded to make it possible to provide different media barring depending of who is calling (for example "I do not allow video media for my work colleagues but I do for my family"), then each client needs to keep track of all access rules. This is something that is normally handled by the network.

Thirdly, in PoC there is a feature for Automatic Answer, where the PoC session is automatically answered and the user does not explicitly answer in order to speed up session set up and usability. For PoC 2 video media it is proposed never to use Automatic Answer for privacy reasons. That implies that every session containing video will require a manual answer from the user even if it does not want to handle video. An example is where a recipient has set AutoAnswer=TRUE and VideoMedia=FALSE; if the recipient with these settings gets an invite to a PoC session containing both Audio and Video, the AutoAnswer feature cannot be used since media Video in a session implies that AutoAnswer is overridden.

It is desirable to address one or more of the above issues.

One option for media barring would be to set a parameter in the PoC Server for each PoC Client which sets out what media that Client has opted to handle, and then the PoC server would bar unwanted media on the media plane. With such a solution, the control plane for PoC will still contain unnecessary media parameters (SDP) for media that the user does not want to handle. Also, this would lead to difficulties when implementing the PoC Client as that would need to be a means for correlating what media barring has already been set in the PoC Server with the signaling used for the control plane. When using multiple clients, all this would need to be coordinated between the clients.

SUMMARY

According to a first aspect of the present invention there is provided a method for use in a push to talk over cellular service, comprising: receiving a message from a second terminal inviting a first terminal to establish a push to talk type session, the message comprising a list of media types that the second terminal may send to the first terminal during the session; in response to receipt of the message, and based on information specifying, for the or each of at least one media type, in what circumstance, if at all, the first terminal would accept that media type in a push to talk type session, reviewing the list to leave out any media types that the first terminal would not accept from the second terminal, and forwarding the message with the reviewed list to the first terminal if appropriate; and receiving at least some of the information in the form of an Extensible Markup Language, XML, document from a PoC XML Document Management Server, XDMS, remote server.

The method may comprise, if it is determined from the information that there are no media types being offered by the second terminal that the first terminal would accept, not forwarding the message to the first terminal and sending a message to the second terminal rejecting the session invitation.

The method may comprise receiving a response message sent from the first terminal accepting the session and confirming as acceptable the media types from the reviewed list, and forwarding the response message to the second terminal.

The method may comprise setting up the session based on the media types confirmed as acceptable in the response message.

The response message may be a 200 OK message of the Session Initiation Protocol.

The method may comprise receiving at least some of the information from the first terminal in a Publish message of the Session Initiation Protocol prior to receiving the invite message.

The method may comprise acknowledging the Publish message with a 200 OK message of the Session Initiation Protocol.

The method may comprise sending at least some of the information from the PoC XDMS remote server.

The method may comprise determining at least some of the information based on at least one predetermined characteristic of the first terminal.

One of the at least one predetermined characteristic of the first terminal may relate to the type of the push to talk type service that it is operating.

The information may specify, for at least one media type, whether or not the first terminal would accept that media type in a push to talk type session based not only on the media type itself but also on at least one other predetermined criterion.

One predetermined criterion may relate to the identity of the inviting terminal and/or its user.

The information may specify, for at least one media type, whether or not the first terminal would accept that media type in a push to talk type session based only on the media type itself.

A default policy may be referred to for any media type not specified in the information.

The invite message may be an Invite message of the Session Initiation Protocol.

Session Description Protocol parameters may be used to specify the list of media types.

According to a second aspect of the present invention there is provided an apparatus for use in a push to talk over cellular service, comprising: means for receiving a message from a second terminal inviting a first terminal to establish a push to talk type session, the message comprising a list of media types that the second terminal may send to the first terminal during the session; means for, in response to receipt of the message, and based on information specifying, for the or each of at least one media type, in what circumstance, if at all, the first terminal would accept that media type in a push to talk type session, reviewing the list to leave out any media types that the first terminal would not accept from the second terminal, and forwarding the message with the reviewed list to the first terminal if appropriate; and means for receiving at least some of the information in the form of an Extensible Markup Language, XML, document from a PoC XML Document Management Server, XDMS, remote server.

According to a third aspect of the present invention there is provided an operating program which, when loaded into an apparatus, causes the apparatus to become an apparatus according to the second aspect of the present invention.

According to a fourth aspect of the present invention there is provided an operating program which, when run on an apparatus, causes the apparatus to carry out a method according to the first aspect of the present invention.

The operating program may be carried on a carrier medium. The carrier medium may be a transmission medium. The carrier medium may be a storage medium.

An embodiment of the present invention enables a client (and user) handling different media to tell a server what media it likes to handle. Based on this information the server can strip out that information from the signaling, and hence only enable communication with the wanted media. This is more efficient than blocking on the media plane.

In an embodiment of the present invention, the decision point of what media to handle is moved from where, for each session, the client needs to answer what types of media can be handled, to a network-based approach where the client instructs another node to act on its behalf. With such a configuration set in a node in the network, it is possible to have that, or another node, actively to strip out the media from the control signaling.

Based on this, an embodiment of the present invention will benefit from one or more of: (a) reducing the signaling packages since unwanted media parameters are removed; (b) reducing unnecessary control signal traffic to the recipient if all media for a particular session is barred; (c) easier client implementation since the client does not need to correlate the barring settings with how media parameters are treated in the control signaling; and (d) providing a solution to particular PoC problems such as sessions with PoC 1 and PoC 2 session, as well as the special case of AutoAnswer and Video media barring as previously described.

DETAILED DESCRIPTION OF THE PREFERRED EMBODIMENTS

In one embodiment of the present invention, the handling of the media control parameters (such as which of the SDP parameters will be accepted in the SIP Invite message) is moved to the network (e.g., a PoC Server), thereby overcoming at least some of the limitations that have previously been described. The PoC Server (or other node) may simply remove from the control signaling any media parameters for barred media types, based for example on previous preferences and settings sent by a PoC Client to the PoC Server (or other node).

Figure 1:
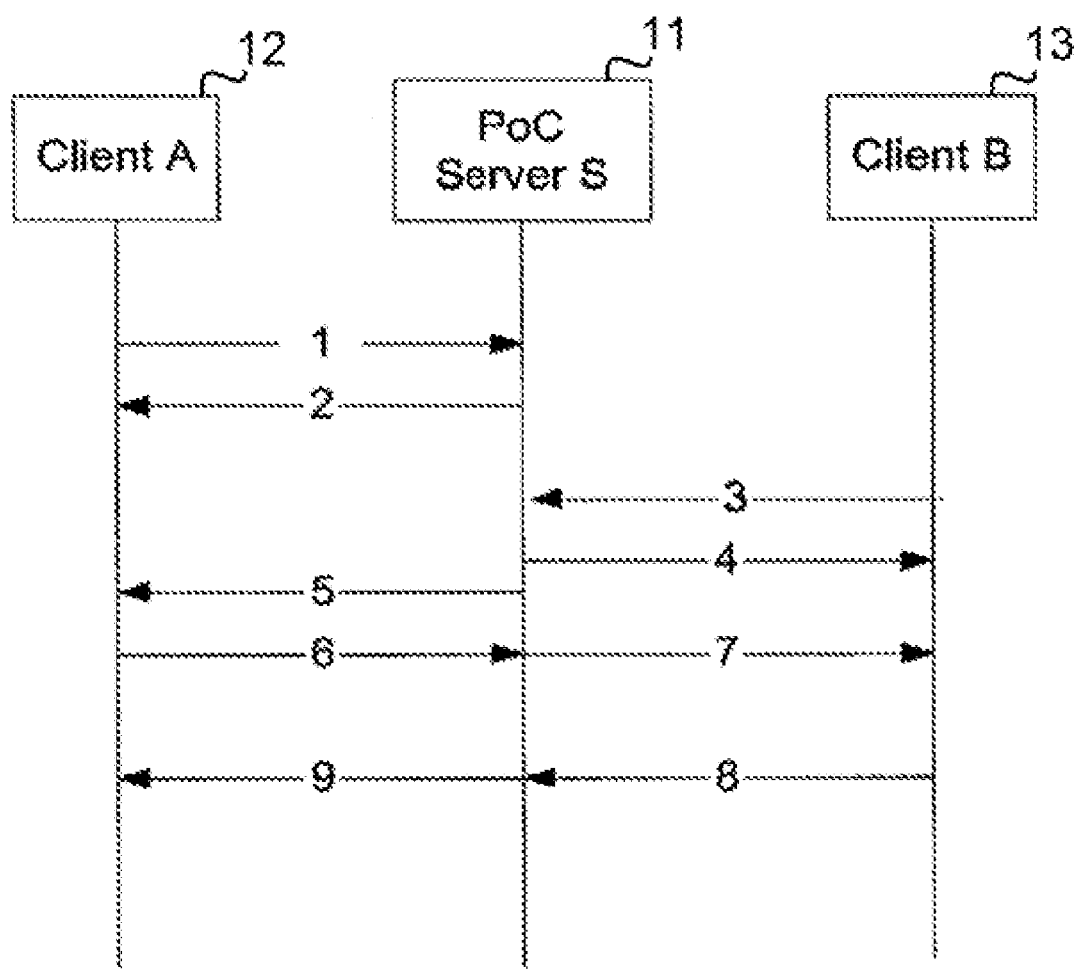
FIG. 1 is a message exchange diagram schematically illustrating the exchange of messages between two PoC Clients and a PoC Server in an embodiment of the present invention.
Figure 2:
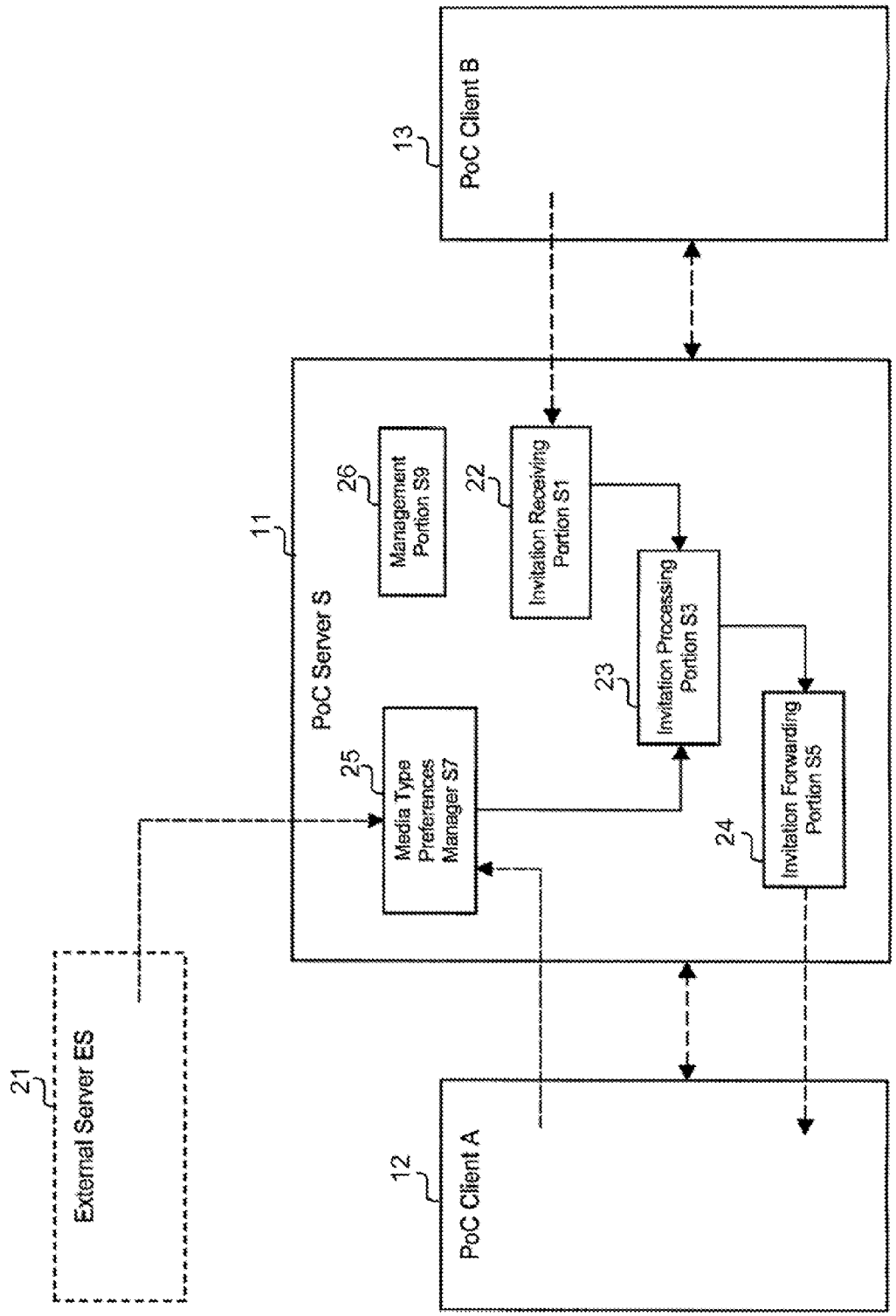
FIG. 2 is a block diagram schematically illustrating parts of the PoC Server of FIG. 1, and illustrates interactions between the PoC Server and other elements from FIG. 1 and an external server.

An embodiment of the present invention will now be described in more detail with reference to FIGS. 1 and 2. FIG. 1 is a message exchange diagram illustrating the exchange of messages between PoC Client A 12 and PoC Client B 13 and a PoC Server S 11 in this embodiment. FIG. 2 is a block diagram schematically illustrating parts of the PoC Server S 11, as well as the interactions between an external server ES 21, PoC Client A 12, PoC Client B 13, and the PoC Server S. PoC Server S comprises an Invitation Receiving Portion S1 22, an Invitation Processing Portion S3 23, an Invitation Forwarding Portion S5 24, and a Media Type Preferences Manager S7 25. These parts of the PoC Server S operate under overall control of a Management Portion S9 26, which also handles any processing and communication functions not performed by parts S1, S3, S5 and S7.

In step 1, the PoC Client A 12 informs the Media Type Preferences Manager S7 25 of the PoC Server S 11 about the media types that it does not wish to or cannot accept. This may be on the basis that the PoC Client cannot physically handle that media type, permanently or temporarily, or that the user does not wish to receive that media type, or any other reason. Alternatively, the PoC Client A may inform the PoC Server S of the media types that it will accept, or a combination of the above. This is achieved in this embodiment using a SIP PUBLISH message, which is described in more depth below. The Media Type Preferences Manager S7 stores this information for future reference.

In step 2, the PoC Server S 11 acknowledges the request. This is achieved in this embodiment with a SIP 200 OK message.

In step 3, the PoC Client B 13 indicates to the PoC Server S 11 its intention to establish a PoC Session with PoC Client A 12, at the same time indicating the media it wants to use in the PoC Session. This is achieved in this embodiment by sending a SIP INVITE message, with a list of the media types that are intended to be used in the PoC Session being included in the SDP PARAMETERS in the SIP INVITE message. For example, this may specify talk bursts, video clip, pictures and so on. This is received in the PoC Server S by the Invitation Receiving Portion S1 22.

In step 4, the PoC Server S 11 responds with a SIP RINGING acknowledgement.

In step 5, the SIP INVITE message is forwarded to PoC Client A 12 by the Invitation Forwarding Portion S5 24 in the PoC Server S 11. However, before doing so, the Invitation Processing Portion S3 23 reviews the list of media items in the SIP INVITE message and removes any SOP PARAMETERS that targets media types that PoC Client A will not accept. This review is performed using information from the Media Type Preferences Manager S7 25.

In step 6, PoC Client A 12 acknowledges and accepts the session with a SIP 200 OK message. This message also contains the SDP PARAMETERS, and since PoC Client A will not have received any information about the media types that it does not want to handle, these parameters will never be returned to the PoC Server S 11 and PoC Client B 13.

In step 7, the 200 OK acknowledgement is forwarded to PoC Client B 13.

In step 8, PoC Client B 13 sets up the PoC Session using only the media that PoC Client A 12 has been acknowledging.

In step 9, the agreed media is transferred from PoC Client B 13 to PoC Client A 12.

As an alternative to steps 1 and 2, or in addition to those steps, the PoC Server S 11 may receive information relating to the media type preferences of the PoC Client A 12 in some predetermined format from the external server ES 21, either in advance or on request. For example, the information could be defined in an XML (Extensible Markup Language) document stored in the PoC XDMS (XML Document Management Server). This would enable a more flexible usage of media barring, where barring can be specified per individual users. Essentially, the information would specify, for the or each of one or more media types, in what circumstances, if at all, the PoC Client A would accept that media type in a push to talk session. This may be expressed conditionally or unconditionally. For example, the information may specify that PoC Client A 12 will accept video from PoC Client B 13, but not from PoC Client C (not shown). It may accept pictures from Joe Bloggs, but not from John Smith. It may accept voice from any PoC Client or user. It may accept certain media types only for Session invites received at certain times of day. Many other such rules will be apparent. A particular may apply to a single media type, or to many media types, and so on. (At least some of this flexibility can also be implemented using the SIP PUBLISH method set out previously.)

In contrast to the above-described embodiment of the present invention, an alternative solution to this problem (not embodying the present invention) would be that the PoC Server S 11 does not strip out the media information (SDP) regarding the unwanted media in step 3, with blocking of the media instead being performed only in the media plane (step 8). However, this alternative solution would be inefficient in comparison to an embodiment of the present invention because: (a) the SIP signaling would need to carry extra SDP information that will never be used: this might be minimal in some cases but would depend of media; (b) the PoC Client A 12 would be required to have complete knowledge about the media it cannot handle so it does not get "confused" when receiving additional media information; and (c) sending media in step 8 that cannot anyway be handled by PoC Client A is wasteful, especially for large media over the air.

There will now be described in more depth how the PoC Client A 12 publishes details of its media barring settings to the PoC Server S 11 (steps 1 and 2 above). An embodiment of the present invention proposes that the PoC Client A uses a SIP PUBLISH message to inform the PoC Server S of what media types it would like to bar. One way would be to express the barring in terms of what media is supported, with the rest being considered barred. An embodiment of the present invention can be based either on an explicit barring method, where the media barred is explicitly expressed, or on an implicit barring method, where the media that is NOT barred is expressed in the SIP PUBLISH (or similar) message, or on a combination.

Firstly, the PoC Client A 12 constructs a SIP PUBLISH message containing the SDP body with barring information. The barred media types are either expressed explicitly as a list of barred media, or implicitly as a list of non-barred media, or a combination.

Secondly, the SIP PUBLISH message is sent to the user's PoC Server S 11.

Thirdly, the PoC Server S 11 returns a 200 OK acknowledgement if it accepts it, and stores the barring information for use in reacting to incoming sessions for that user.

The barring settings can be published as a general setting for all incoming sessions, or published per user such that different media are barred depending the originator of the session.

A special case for setting the media barring parameters is where the PoC Server S (and/or service provider) sets these parameters on behalf of the user. One example of this is where the user has a PoC 1 Client and connects to a PoC 2 system. As PoC 1 only handles audio/talkburst, the PoC 2 system could set media barring for all media types except audio/talkburst.

In this way, users using PoC 1 and PoC 2 Clients can communicate with the same mechanisms.

Further detail will now be provided of Session set up when the terminating side is using media barring.

The PoC Server S 11 on the terminating side of the PoC Session is called the Participating Function, PF. It is the PF that acts based on the user settings of the terminating side to bar or allow the different media used in a PoC Session.

When the PF receives an incoming PoC Session directed to one of its users it will determine whether that user has published any media barring settings. The barring settings can be general or specified according to the originating user, for example. (There are other tasks that the PF would perform at this stage, such as checking access lists, but that is not elaborated here.) Based on these settings the PF would set up media resources for the subset based on the media in the incoming session minus the barred media. Based on the same settings, the PF will remove the SDP information in the SIP message regarding that media and send out the SIP message to the receiving client. In this way the receiving client will never see any information or signaling related to the barred media.

A special case is where all the media types specified in the incoming session are barred by the receiving user. In this case, the PoC Server S 11 may either reject the PoC Session based on the barring settings without the knowledge of the recipient, or it may notify the recipient that a PoC Session was requested but was never established as all the media in the PoC Session was barred.

Another special case is for sessions with Video media. As mentioned previously, for privacy reasons the PoC setting "automatic answer" will never be applied to Video, so that the recipient has always to manually accept such a PoC Session. In the case where the user has barred Video and at the same time has "automatic answer" set, with an embodiment of the present invention the PoC Server S 11 removes the video media information and in this way the PoC Session can be treated as a Session without Video, and thereby the automatic answer functionality can be applied.

Although an embodiment of the present invention is described above in relation to PoC, it will be appreciated that the invention is not limited to PoC. The term "push to talk" service is used here to identify services of a walkie-talkie nature. These are services that allow two or more users to be connected together quickly for the exchange of talk bursts. Push to Talk services differ from conventional voice calls in that these services allow only one person to talk at a given time. In order to talk, users must have control of the "floor". Control is typically achieved by one user releasing a talk button to release floor control, and another user pressing a talk button to assume floor control. It is to be understood that the term "push to talk" used in the appended claims is not intended to imply the use of any particular protocol.

It is also to be understood that the scope of the present invention is not limited to the transfer of talk or speech data in a talk session, and the appended claims are to be read as covering the transfer of any type of data in a data transfer session, including but not limited to speech data. As such, terminology such as "Talk Burst Request" and "Talk Burst" is not to be interpreted as being limited to talk, i.e. speech, data only, but is used for consistency with PoC 1 terminology; such phrases can include within their meaning the transfer of any type of data. In PoC 2, different terminology may be used for concepts that correspond directly with those in PoC for example the phrases "Media Burst Request" and "Media Burst" may be used instead.

It will be appreciated that operation of one or more of the above-described components can be controlled by a program operating on the device or apparatus. Such an operating program can be stored on a computer-readable medium, or could, for example, be embodied in a signal such as a downloadable data signal provided from an Internet website. The appended claims are to be interpreted as covering an operating program by itself, or as a record on a carrier, or as a signal, or in any other form.

The invention claimed is:

1. A method for use in a push to talk over cellular (PoC) server, the method comprising the steps of:
  receiving a message from a second terminal, Client B, inviting a first terminal, Client A, to establish a PoC session, wherein the received message comprises a list of media types that Client B offers to send to Client A during the PoC session;
  receiving media type preferences information for Client A, the media type preferences information specifying, for each media type Client A is capable of receiving, in what circumstances Client A would accept that media type in a PoC session;
  comparing Client B's list of offered media types to Client A's media type preferences information to eliminate any media types that Client A would not accept from Client B under current circumstances, thereby creating a modified list; and
  forwarding the message with the modified list to Client A when there is at least one media type from the list that is acceptable to Client A;
  wherein at least some of the media type preferences information is received from Client A in a PUBLISH message of the Session Initiation Protocol; and
  wherein at least some of the media type preferences information is received from an external PoC XML Document Management server (ES) in the form of an Extensible Markup Language (XML) document.

2. The method as claimed in claim 1, further comprising, if it is determined from the media type preferences information that there are no media types being offered by Client B that Client A would accept, not forwarding the message to Client A and sending a message to Client B rejecting the session invitation.

3. The method as claimed in claim 1, further comprising the steps of:
  receiving a response message sent from Client A accepting the session and confirming as acceptable the media types from the modified list; and
  forwarding the response message to Client B.

4. The method as claimed in claim 3, further comprising setting up the session based on the media types confirmed as acceptable in the response message.

5. The method as claimed in claim 3, wherein the response message is a 200 OK message of the Session Initiation Protocol.

6. The method as claimed in claim 1, wherein at least some of the media type preferences information is received from the external PoC XML Document Management Server on request by the server.

7. The method as claimed in claim 1, further comprising acknowledging the PUBLISH message with a 200 OK message of the Session Initiation Protocol.

8. The method as claimed in claim 1, further comprising sending at least some of the media type preferences information from the external PoC XML Document Management Server.

9. The method as claimed in claim 1, further comprising determining at least some of the media type preferences information for use in the reviewing step based on at least one predetermined characteristic of Client A.

10. The method as claimed in claim 9, wherein one of the at least one predetermined characteristic of Client A relates to the type of the PoC service that Client A is operating.

11. The method as claimed in claim 1, wherein the media type preferences information specifies, for at least one media type, whether or not Client A would accept that media type in a PoC session based not only on the media type itself but also on at least one other predetermined criterion.

12. The method as claimed in claim 11, wherein one predetermined criterion relates to the identity of the inviting terminal and/or its user.

13. The method as claimed in claim 1, wherein the media type preferences information specifies, for at least one media type, whether or not Client A would accept that media type in a PoC session based only on the media type itself.

14. The method as claimed in claim 1, wherein a default policy is referred to for any media type not specified in the media type preferences information.

15. The method as claimed in claim 1, wherein the message inviting Client A to establish a PoC session is an Invite message of the Session Initiation Protocol.

16. The method as claimed in claim 1, wherein Session Description Protocol parameters are used to specify the list of media types.

17. An apparatus for use in a push to talk over cellular (PoC) server, comprising:
  means for receiving a message from a second terminal, Client B, inviting a first terminal, Client A, to establish a PoC session, wherein the received message comprises a list of media types that Client B offers to send to Client A during the PoC session;
  means for forwarding the message to Client A when there is at least one media type acceptable to both Client A and Client B;
  means for receiving media type preferences information for Client A, the information specifying, for each media type Client A is capable of receiving, in what circumstances Client A would accept that media type in a PoC session, wherein at least some of the media type preferences information is received from the first terminal in a PUBLISH message of the Session Initiation Protocol, and at least some of the media type preferences information is received from an external PoC XML Document Management server (ES) in the form of an Extensible Markup Language (XML) document;
  means for comparing Client B's list of offered media types to the Client A's media type preferences information to eliminate any media types that Client A would not accept from Client B, thereby creating a modified list; and
  means for forwarding the message with the modified list to Client A when there is at least one media type from the list that is acceptable to Client A.

18. An operating program stored on a non-transitory memory, which when run on a processor of an apparatus for use in a push to talk over cellular (PoC) server, causes the apparatus to perform the steps of:
  receiving a message from a second terminal, Client B, inviting a first terminal, Client A, to establish a PoC session, wherein the received message comprises a list of media types that Client B offers to send to Client A during the PoC session;

receiving media type preferences information for Client A, the information specifying, for each media type Client A is capable of receiving, in what circumstances Client A would accept that media type in a PoC session;

comparing Client B's list of offered media types to Client A's media type preferences information to eliminate any media types that Client A would not accept from Client B, thereby creating a modified list; and forwarding the message to Client A when there is at least one media type from the list that is acceptable to Client A;

wherein at least some of the media type preferences information is received from Client A in a PUBLISH message of the Session Initiation Protocol; and wherein at least some of the media type preferences information is received from an external PoC XML Document Management server (ES) in the form of an Extensible Markup Language (XML) document.

* * * * *

UNITED STATES PATENT AND TRADEMARK OFFICE
CERTIFICATE OF CORRECTION

PATENT NO. : 8,385,848 B2
APPLICATION NO. : 13/405959
DATED : February 26, 2013
INVENTOR(S) : Albertsson et al.

It is certified that error appears in the above-identified patent and that said Letters Patent is hereby corrected as shown below:

In the Specifications

In Column 1, Line 8, delete "109 filed" and insert -- 109, filed --, therefor.

In Column 1, Line 8, delete "2008" and insert -- 2008, --, therefor.

In Column 2, Line 43, delete "PoC1" and insert -- PoC 1 --, therefor.

In Column 2, Line 57, delete "video, is" and insert -- video is --, therefor.

In Column 3, Line 27, delete "depending of who" and insert -- depending on who --, therefor.

In Column 6, Line 1, delete "13 and" and insert -- 13, and --, therefor.

In Column 6, Line 44, delete "SOP" and insert -- SDP --, therefor.

In Column 7, Line 27, delete "used:" and insert -- used; --, therefor.

In Column 9, Line 1, delete "PoC for" and insert -- PoC 1; for --, therefor.

In the Claims

In Column 10, Line 56, in Claim 17, delete "to the Client" and insert -- to Client --, therefor.

Signed and Sealed this
Sixth Day of August, 2013

Teresa Stanek Rea
*Acting Director of the United States Patent and Trademark Office*